United States Patent [19]

Hankins et al.

[11] Patent Number: 5,244,642

[45] Date of Patent: Sep. 14, 1993

[54] METHOD FOR CONDITIONING FLUE GAS

[75] Inventors: William G. Hankins, Issaquah; Burton Brooks, Bellevue; John C. Chittenden; William B. Sheats, both of Seattle; Patrick J. Bader, Kent, all of Wash.

[73] Assignee: The Chemithon Corporation, Seattle, Wash.

[21] Appl. No.: 900,124

[22] Filed: Jun. 18, 1992

[51] Int. Cl.$^5$ .................... C01B 17/00; B03C 1/00
[52] U.S. Cl. ........................... 423/242.1; 95/58
[58] Field of Search ............. 423/242 A, 242.1; 55/5

[56] References Cited

U.S. PATENT DOCUMENTS

| | | | |
|---|---|---|---|
| 3,993,429 | 11/1976 | Archer | 431/5 |
| 4,770,674 | 9/1988 | Tellini et al. | 55/5 |
| 4,779,207 | 10/1988 | Woracek et al. | 55/5 |
| 4,931,265 | 6/1990 | Leussler | 423/244 |
| 5,029,535 | 7/1991 | Krigmont et al. | 110/345 |
| 5,032,154 | 7/1991 | Wright | 55/106 |

FOREIGN PATENT DOCUMENTS 1198878 1/1986 Canada.
2088350 9/1984 United Kingdom.

*Primary Examiner*—Gregory A. Heller
*Attorney, Agent, or Firm*—Marshall, O'Toole, Gerstein, Murray & Borun

[57] ABSTRACT

A method for conditioning flue gas to improve the removal of fly ash by an electrostatic precipitator employs a relatively high concentration (4–7½%) of $SO_3$ conditioning agent. The $SO_3$ is formed by combusting sulfur and excess air in a sulfur burner to produce a mixture of air and $SO_2$ and converting the $SO_2$ to $SO_3$ in a catalytic converter. The ratio of air to sulfur is maintained constant over a wide range of $SO_3$ production rates, and the air is unheated during most production rates. The mixture of air and $SO_2$ from the sulfur burner is cooled without increasing the volume of the gaseous mixture.

17 Claims, 1 Drawing Sheet

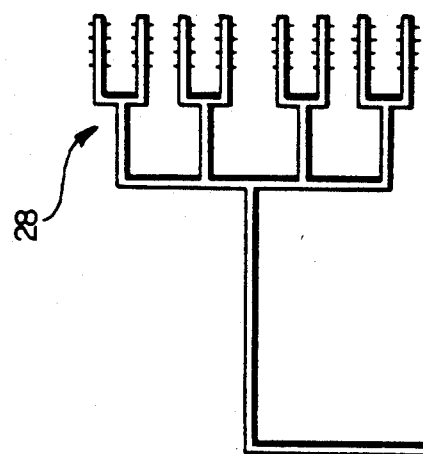
FIG.1
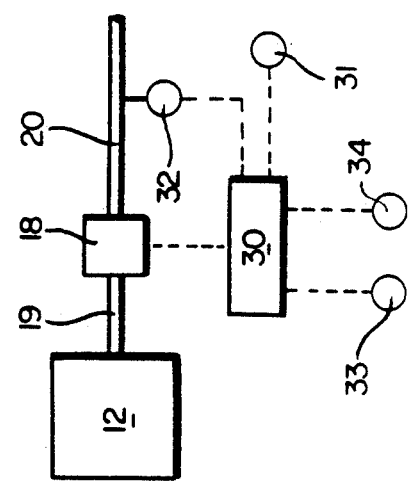
FIG.2
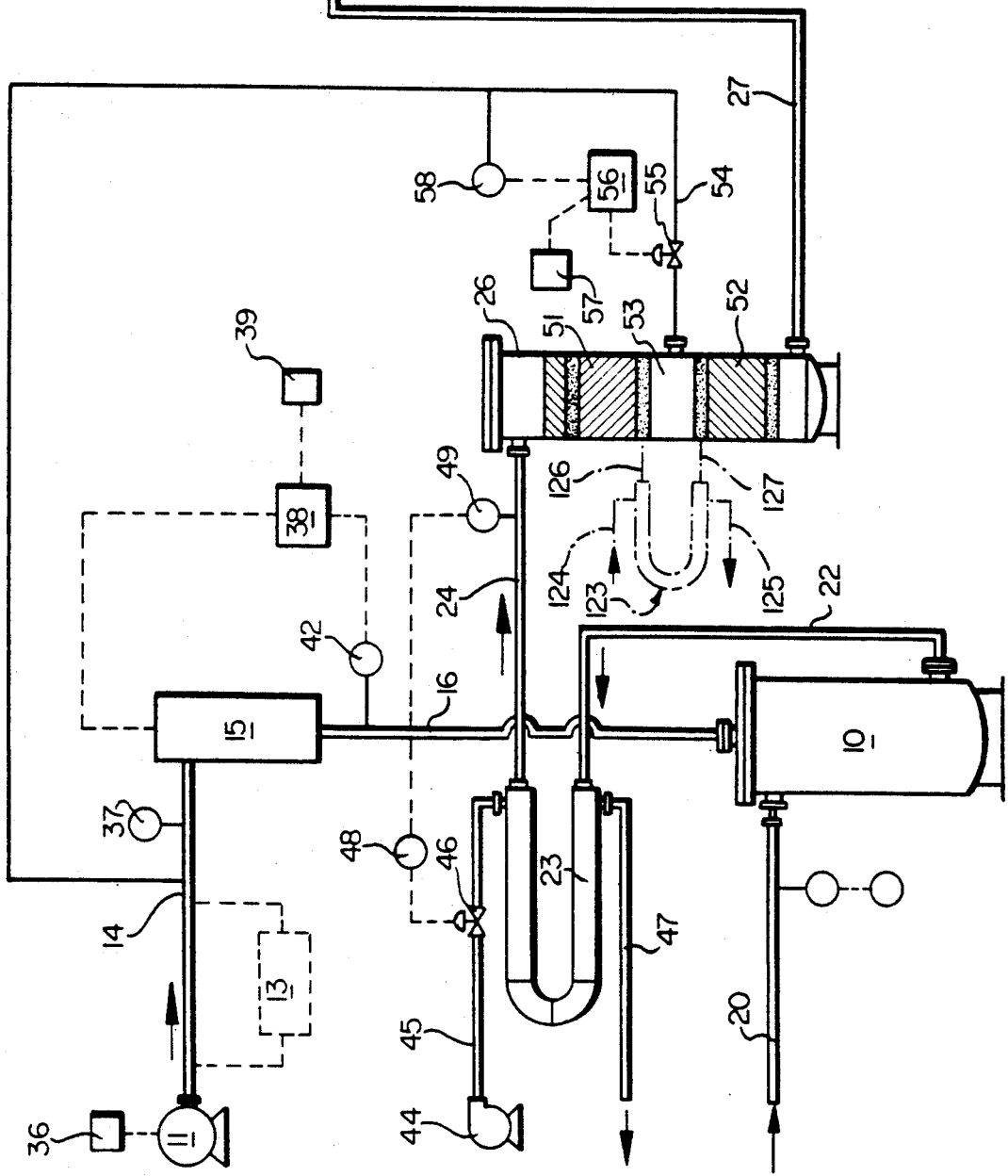

METHOD FOR CONDITIONING FLUE GAS

BACKGROUND OF THE INVENTION

The present invention relates generally to methods for conditioning flue gas from coal-burning boilers to facilitate the removal of fly ash from the flue gas. The present invention relates more particularly to flue gas conditioning methods employing the injection of sulfur trioxide ($SO_3$) into the flue gas to render the fly ash more susceptible to removal by an electrostatic precipitator.

Coal is combusted with air in a boiler to generate heat which, in turn, generates steam which, in turn, powers a turbine to generate electricity. Coal contains sulfur. When coal is combusted, the products of combustion include fly ash and sulfur dioxide ($SO_2$) which are exhausted from the boiler through a flue as part of an exhaust stream known as flue gas. Fly ash and $SO_2$ are both undesirable pollutants and must be removed from the flue gas to a desirably low level, usually set by environmental regulators.

One approach to removing fly ash is to employ an electrostatic precipitator through which the flue gas flows prior to being exhausted into the atmosphere. The efficiency with which fly ash is removed from the flue gas by the electrostatic precipitator depends in part upon the electrical conductivity of the fly ash. This, in turn, is influenced by the absorption, by the particles of fly ash, of sulfuric acid which is generated as a by-product of the combustion process through the reaction of sulfur dioxide with air and water in the flue gas. When the flue gas contains relatively large quantities of $SO_2$, there is a comparably large quantity of sulfuric acid produced in the flue gas, and the amount of sulfuric acid available to precipitate upon the fly ash particles is sufficient to produce relatively efficient removal of fly ash at the electrostatic precipitator.

In coal having a relatively large sulfur content, only a portion of the $SO_2$ generated by combustion is required for conditioning the fly ash. The rest of the $SO_2$ is excess. Large amounts of excess $SO_2$ in flue gas exhausted to the atmosphere are undesirable because $SO_2$ can cause pollution problems, such as acid rain, absent expensive expedients for removing $SO_2$ from the flue gas. To reduce the amount of sulfur dioxide generated by the combustion process, boiler operators have been switching to coal having a relatively low sulfur content. However, the combustion of low sulfur coal not only reduces pollution problems due to excess $SO_2$, but also the amount of $SO_2$ produced by the combustion process is then not sufficient to produce the quantities of sulfuric acid required to efficiently remove fly ash at the electrostatic precipitator. To combat the problem described in the last sentence, boiler operators have been generating $SO_3$ extraneously for injection into the flue gas to combine therein with air and water from the flue gas to form sufficient sulfuric acid to precipitate upon the particles of fly ash and provide the necessary efficiency for electrostatic removal of the fly ash from the flue gas.

In one general type of extraneous $SO_3$ generator, sulfur and air are reacted in a sulfur burner to produce a first mixture comprising sulfur dioxide and air, the sulfur dioxide in the first mixture is converted to $SO_3$ in a catalytic converter to produce a second mixture comprising $SO_3$ and air and that mixture is then injected into the flue gas. Many conventional $SO_3$ generators of this type produce a mixture of $SO_3$ and air having an $SO_3$ concentration of about 1–2%, in turn produced from a first mixture of $SO_2$ and air having an $SO_2$ concentration similarly of about 1–2%. As used herein, when $SO_2$ and $SO_3$ contents are expressed as per cents, they are volume per cents.

Efficient conversion of $SO_2$ to $SO_3$ in a catalytic converter generally requires that the $SO_2$ entering the catalytic converter be within a predetermined temperature range, e.g. in the range 780°–850° F. (416°–556° C.). When the concentration of $SO_2$ in the mixture of air and $SO_2$ produced by the sulfur burner is relatively low (e.g. 1–2%), the temperature of that mixture may not be sufficiently high to satisfy the minimum temperature requirement necessary for a mixture of $SO_2$ and air entering a catalytic converter or even to enable complete combustion of the sulfur in the sulfur burner. The low temperature in a mixture of air and $SO_2$ having a low $SO_2$ concentration is due to the cooling effect of the relatively large volume of air in such a mixture. For example, assuming one desires a given quantity of $SO_2$, if the concentration of $SO_2$ in the mixture of $SO_2$ and air is 1%, the volume of air in that mixture is four times greater than the volume of air in a mixture of air and $SO_2$ having a $SO_2$ concentration of 4%.

In order to assure that the mixture of air and $SO_2$ produced at the sulfur burner has the minimum desired temperature, it has been conventional to preheat the air introduced into the sulfur burner. The preheating operation is usually conducted in an electric heater, and this consumes relatively large quantities of electric energy which, in turn, is relatively expensive.

Another drawback to the employment of a mixture of $SO_2$ and air having a relatively low $SO_2$ concentration is that, because of the relatively large air volume, the processing vessels and conduits required to accommodate the large gas volume are themselves relatively large. This increases the expense of the processing equipment; and, in addition, there are increased heat losses with larger-sized processing equipment. Increased heat losses, of course, require additional preheating of the air, in turn, expending additional energy and entailing increased operating expense.

SUMMARY OF THE INVENTION

The present invention provides a method for producing $SO_3$ for injection into flue gas wherein the concentration of $SO_2$ in the mixture of air and $SO_2$ introduced into the converter is relatively high (e.g., 7–10%) at the maximum $SO_3$ (and $SO_2$) production rate of the flue gas conditioning system. The maximum $SO_2$ production rate is determined by the demand for $SO_3$ to condition flue gas from the boiler, when the boiler is operating at full capacity. When the boiler is operating at less than full capacity, the demand for $SO_3$ (and $SO_2$) decreases, and the production rate of $SO_2$ is decreased accordingly. The relatively high $SO_2$ concentration is maintained at all $SO_2$ production rates between the maximum production rate for the flue gas conditioning system and an intermediate production rate substantially less than the maximum rate (e.g., 50–60%). In a range of production rates between the maximum rate and the intermediate rate, a decrease in the production rate is accompanied by corresponding decreases in both sulfur and air flow rates to the sulfur burner, thereby maintaining in that range a constant sulfur to air ratio which in turn maintains a constant $SO_2$ concentration in the mixture of $SO_2$ and air exiting the sulfur burner.

The intermediate production rate is that rate at which a decrease in the sulfur flow rate is unaccompanied by a decrease in the air flow rate to the sulfur burner, thereby establishing a minimum air flow rate and resulting in a decrease in $SO_2$ concentration with further decreases in production rate. The minimum air flow rate is that rate required to prevent fly ash from plugging injectors included in the conditioning system to inject $SO_3$ into the flue gas.

The $SO_2$ concentration decreases with further decreases in production rate below the intermediate production rate; however, the $SO_2$ concentration is still sufficiently high (e.g., 4–5% $SO_2$) to generate enough heat during combustion of sulfur in the sulfur burner to eliminate preheating of the air introduced into the sulfur burner during all $SO_2$ production rates between the maximum production rate and a lesser production rate substantially less than the intermediate production rate (e.g., about 35% of the maximum rate). The absence of preheating during operation at production rates above the aforementioned lesser rate reduces substantially the energy expended due to preheating of the air, in turn reducing substantially the operating expense for the flue gas conditioning system.

Because $SO_2$ concentration is relatively high at the maximum $SO_2$ production rate, the volume of air handled by the system is relatively low at all $SO_2$ production rates, so that the size of the vessels and conduits in the system can be reduced substantially, thereby resulting in a substantial reduction in equipment cost. In addition, in one embodiment both the mixture of air and $SO_2$ and the mixture of air and $SO_3$ are pressurized sufficiently to allow a substantial reduction in the size of the flue gas conditioning system on that account. Pressurization assists in producing complete combustion of the sulfur at the sulfur burner and avoids carry-over of uncombusted sulfur downstream of the sulfur burner.

Because of the relatively high concentration of $SO_2$ in the mixture of air and $SO_2$ produced by the sulfur burner, the temperature of that mixture may exceed the maximum temperature desired for $SO_2$ entering the catalytic converter, over a relatively wide range of production rates. In such a case, the mixture of air and $SO_2$ is cooled between the sulfur burner and the catalytic converter, but the cooling step is conducted without diluting the high $SO_2$ concentration with additional air.

Other features and advantages are inherent in the method claimed and disclosed or will become apparent to those skilled in the art from the following detailed description in conjunction with the accompanying diagrammatic drawing.

BRIEF DESCRIPTION OF THE DRAWING

FIG. 1 is a schematic diagram illustrating the major portion of an apparatus for performing an embodiment of a method in accordance with the present invention; and FIG. 2 is a schematic diagram of an initial portion of the apparatus.

DETAILED DESCRIPTION

Referring initially to the FIGURES, there is shown a sulfur burner 10 into which is introduced air from an air blower 11 and molten sulfur from a source 12 of molten sulfur (FIG. 2). Air blower 11 communicates with sulfur burner 10 through a first conduit 14, a heater 15 (most of the time inoperative) and a second conduit 16.

Molten sulfur enters sulfur burner 10 under the urging of a pump 18 having an inlet conduit 19 communicating with the source 12 of molten sulfur and an outlet conduit 20 communicating with sulfur burner 10.

The sulfur and air are combusted in sulfur burner 10 to produce a first mixture comprising air and sulfur dioxide which is withdrawn from sulfur burner 10 through the inlet end of a conduit 22 having an outlet end communicating with the inlet of a cooler 23 having an outlet communicating with the inlet end of a conduit 24 having an outlet end communicating with the inlet of a catalytic converter 26. The sulfur dioxide is converted to sulfur trioxide in converter 26 to produce a mixture comprising air and sulfur trioxide which is withdrawn from converter 26 through an outlet communicating with the inlet end of a conduit 27 having an outlet end communicating with an injector manifold assembly, indicated generally at 28, for injecting the mixture of sulfur trioxide and air into a flue gas stream (not shown).

The arrangement for introducing sulfur into sulfur burner 10 is depicted in FIG. 2 as a block diagram. In actual practice, source 12 is a tank containing molten sulfur and pump 18 is, typically, a variable speed, submerged gear pump located within the tank containing the molten sulfur. The sulfur is maintained in a molten state in tank 12 by steam coils (not shown), and the sulfur is maintained in a molten state in conduit 20 by steam jackets (not shown).

The sulfur is pumped out of tank 12 at a flow rate controlled by a controller 30 which receives a number of input signals including a boiler load signal from 31 and a sulfur flow rate signal from a mass flow meter 32 located along conduit 20. The boiler load signal from 31 and the sulfur flow rate signal from 32 are used to calculate, in controller 30, the actual amount of $SO_3$ being introduced into the flue gas, in parts per million (ppm) of $SO_3$. The actual amount of $SO_3$ is compared, in controller 30, with the desired amount of $SO_3$ which is pre-set in the controller, e.g. as maximum and minimum limits for ppm $SO_3$. This produces a primary control signal for sulfur flow which can be further adjusted in controller 30 by one or both of a pair of signals representing flue gas opacity indicated at 33 and electrostatic precipitator power input indicated at 34. The boiler load signal, the opacity signal, and the signal reflecting electrostatic precipitator power input are all parameters which are useful as indicators of the fly ash content of the flue gas, and each such signal may be regarded for purpose of the present invention as a measurement of a parameter reflecting the fly ash content.

Referring now to FIG. 1, air blower 11 is a variable speed, positive displacement blower controlled by a signal 36 from sulfur mass flow meter 32. A positive displacement blower is preferable to a centrifugal blower because the former delivers the same air pressure and the same air flow (in volume per minute) no matter the change in back pressure or pressure drop downstream of blower 11, e.g., as could happen in the case of pluggage by fly ash of the injectors at 28 or in the case of a build-up of debris in catalytic converter 26. One can vary the rate of flow of air produced by blower 11 by varying the speed of the blower, when the latter is a positive displacement blower. When the speed is reduced to reduce the air flow rate, there will be a reduction in system operating pressure.

The air flow rate into heater 15 is measured by a mass flow meter 37 located along conduit 14. The air flow rate from air blower 11 is controlled by a signal 36 reflecting the sulfur flow rate measured at 32. In this manner, one is able to maintain a constant ratio of sulfur to air over a wide range of $SO_2$ production rates and to provide a relatively high $SO_2$ concentration for all $SO_2$ production rates between the maximum production rate for the system and an intermediate production rate substantially less than the maximum rate. An example of a relatively high $SO_2$ concentration is 7-10% $SO_2$ in the mixture of air and $SO_2$ exiting sulfur burner 10.

At the maximum $SO_2$ production rate for the system, the temperature of the mixture of air and $SO_2$ exiting sulfur burner 10 is sufficiently high that preheating of the air entering sulfur burner 10 is not required. The maximum $SO_2$ production rate corresponds to the maximum $SO_3$ production rate for the system. The demand for $SO_3$, for flue gas conditioning purposes, will, at times, drop below the maximum production rate of the system. More particularly, a drop in the demand for $SO_3$ will occur when there is a drop in the amount of fly ash to be treated, and this can occur when there is a drop in the boiler load (signal from 31) or, for a given boiler load, when there is a drop in opacity (signal from 33) or an increase in the power input to the electrostatic precipitator (signal from 34). Any of these signals will reflect a drop in the fly ash content of the flue gas and, in turn, will affect the signal from controller 30 to sulfur pump 18 causing the sulfur flow rate to decrease which, in turn, will cause a corresponding decrease in the air flow rate from air blower 11, over a relatively wide range of production rates from the maximum rate down to an intermediate production rate substantially less than the maximum rate (e.g., 50-60% of the maximum rate). When the demand for $SO_3$ decreases, the amount of $SO_2$ produced by combustion in sulfur burner 10 will correspondingly decrease because of the reduction in sulfur flow and air flow into the sulfur burner.

When the mixture of air and $SO_2$ exiting sulfur burner 10 has a temperature below the minimum temperature (a) required for converting $SO_2$ to $SO_3$ at catalytic converter 26 or (b) otherwise required for system operating purposes, heater 15 will be turned on by a controller 38 which receives a signal 39 from sulfur mass flow meter 32 to control the amount of electrical energy directed to heater 15 in turn to control the temperature to which the air is heated in heater 15. The temperature of the air exiting heater 15 is measured at a temperature measuring element 42 which transmits a signal to controller 38 for use in controlling heater 15 during periods when there is no sulfur flow (e.g., during start-up and stand-by operation of the system).

At the maximum production rate for $SO_3$ (and $SO_2$) and at all production rates down to a lesser production rate substantially less than the intermediate rate (e.g., a lesser rate which is about 35% of the maximum rate), the heat generated by combustion of the sulfur in sulfur burner 10 supplies all the heat energy required to further support combustion and to maintain the entire system above the minimum temperature required to sustain the process. This is because of the relatively large amount of sulfur combusted at all production rates above the aforementioned lesser rate in order to provide the $SO_2$ concentration employed by the present invention. When the amount of sulfur combusted in sulfur burner 10 is insufficient to produce the temperature conditions described in the next to last sentence, then the air entering sulfur burner 10 must be preheated at 15.

Under normal operating conditions for the system, the temperature of the gaseous mixture exiting sulfur burner 10 can be as high as about 1250° F. (677° C.), for example, at the maximum $SO_2$ production rate, and that temperature will usually exceed 850° F. (454° C.) at all production rates above the aforementioned lesser production rate (e.g., above about 35% of the maximum rate). The relatively high temperature of the mixture exiting sulfur burner 10 during most production rates, and the pressurization of sulfur burner 10, assure combustion within sulfur burner 10 of all the sulfur entering the sulfur burner, and this avoids the carryover into converter 26 of sublimed, uncombusted sulfur, which is undesirable.

The amount of cooling undergone by the mixture of air and $SO_2$ entering cooler 23 is controlled by the flow of cooling air through cooler 23. Cooler 23 is a heat exchanger having concentric tubes comprising an inner tube through which flows the mixture of air and $SO_2$ from conduit 22, and an outer tube enclosing the inner tube, and through which cooling air flows in countercurrent relation to the gas flowing through the inner tube. The cooling air originates at a blower 44 connected to the inlet end of a conduit 45 having an outlet end connected to the outer tube of cooler 23. The cooling air withdraws heat from, and reduces the temperature of, the mixture of air and $SO_2$ flowing through cooler 23, in turn heating up the air entering cooler 23 through conduit 45. That heated air is withdrawn from cooler 23 through a conduit 47 and vented to the atmosphere, for example.

The amount of cooling air flowing through conduit 45 is adjusted by a valve 46, in turn controlled by a controller 48 which is operated by a signal from a temperature measuring element 49 on conduit 24 connecting cooler 23 with catalytic converter 26. Normally, an increase in the temperature detected at 49 will cause an adjustment of valve 46 to increase the amount of cooling air flowing through conduit 45 into cooler 23, and vice versa. The arrangement depicted at 44-49 operates to maintain the mixture of air and $SO_2$ entering catalytic converter 26 at a gas temperature of about 750°-850° F. (398°-454° C.). Similarly, when the $SO_2$ production rate is below the lesser rate described above (e.g., below about 35% of the maximum rate) and the $SO_2$ concentration has been reduced to below about 4%, heater 15 is operated to provide the mixture of air and $SO_2$ entering converter 26 with a temperature generally in the same range, i.e., 750°-850° F. (398°-454° C.).

Because the system employs an indirect cooler at 23 to cool the mixture of air and $SO_2$, between sulfur burner 10 and converter 26, there is no need to control the temperature of the mixture with dilution air that would be introduced into sulfur burner 10 or between sulfur burner 10 and converter 26, as would be required in order to cool the mixture in the absence of cooler 23.

Another advantage of cooler 23 arises when one turns down the flue gas conditioning system, i.e., turns down the flow rates of sulfur and air (usually in response to a turn-down in the operating rate of the boiler generating the flue gas). In such a situation, one may simultaneously decrease the cooling capacity of that system merely by reducing the amount of cooling air entering the outer tube of heat exchanger 23 through inlet conduit 45. By accompanying the turn-down in sulfur and air flow rates with a decrease in the cooling capacity at 23, the employment of heater 15 during the turn-down stage is avoided. If one were not able to decrease the cooling capacity at 23 when decreasing the flow rates of sulfur and air, one would have to operate heater 15 during the turn-down stage.

Referring now to converter 26, it has first and second conversion stages 51, 52 respectively. Approximately 70-75% of the $SO_2$ entering first stage 51 is converted to $SO_3$. The conversion reaction is exothermic and, depending upon the $SO_3$ production rate, the gas temperature leaving first conversion stage 51 may be as high as 1100° F. (593° C.); this requires cooling the gas before it enters second conversion stage 52 where the remainder of the conversion occurs. In the illustrated embodiment, cooling between first and second conversion stages 51 and 52 is accomplished in a converter cooling stage 53 into which is introduced cooling air from a conduit 54 which branches off of conduit 14 connected to air blower 11. The partially converted gaseous mixture which exists between the first and second conversion stages of the converter, at cooling stage 53, comprises $SO_3$, $SO_2$ and air.

The amount of cooling air flowing into converter cooling stage 53 is modulated by a flow control valve 55, in turn controlled by a controller 56 which receives a signal 57 reflecting the sulfur flow rate determined by sulfur mass flow meter 32 (FIG. 2). Controller 56 also receives a signal from a mass flow meter 58 which measures the air flow rate through conduit 54 upstream of valve 55. The amount of cooling air required at converter cooling section 53 is determined by the sulfur flow rate signal 57, and the required amount is compared at controller 56 with the actual amount measured at 58 to determine the extent to which valve 55 should be modulated.

As an alternative to the cooling arrangement shown in FIG. 1, one may cool the gaseous mixture from first converter stage 51 with a radiant cooler which would connect the downstream end of converter first stage 51 with the upstream end of converter second stage 52. Such a radiant cooler (not shown) would be located externally of converter 26 and would constitute a thermally conductive metal conduit having an exterior surface exposed to the ambient atmosphere and having a radiating surface area sufficient to radiate enough heat, during the passage of the gaseous mixture through the radiant cooler, to reduce the temperature of the gaseous mixture to a desired lower temperature level (e.g., 825° F. (441° C.)). The radiating surface area can be augmented with cooling fins. The employment of radiant coolers in an $SO_3$ generating system is shown in U.K. Patent GB 2 088 350 B issued Sep. 25, 1984, and the disclosure thereof is incorporated herein by reference.

The use of a radiant cooler is one way to cool, without dilution, the gaseous mixture from converter first stage 51. Another way of cooling that gaseous mixture without dilution is to employ a concentric tube cooler, similar to cooler 23, for indirect cooling of the gaseous mixture with cooling air. Such an arrangement is shown in dash-dot lines at 123 in FIG. 1. Cooling air enters the outer of two concentric tubes through line 124 and exits through line 125. The gaseous mixture from converter first stage 51 enters the inner concentric tube through line 126 and exits through line 127 which communicates with converter second stage 52.

The flow of indirect cooling air into the outer concentric tube of cooler 123 can be controlled by an arrangement similar to that employed with cooler 23 and illustrated at 46, 48, 49 in FIG. 1. The source of the indirect cooling air can be a separate, auxiliary blower similar to blower 44 used with cooler 23.

In that embodiment wherein the partially converted gaseous mixture between converter stages 51 and 52 is cooled with dilution air, the gas downstream of converter 26, in conduit 27 will, of course, have a greater volume than the gas upstream of converter 26. In such a case, the volume of conduit 27 would have to be larger than if the partially converted gaseous mixture between converter stages were cooled by radiant cooling.

In second converter stage 52, the remaining $SO_2$ is substantially converted to $SO_3$, with a corresponding increase in temperature. The overall conversion of $SO_2$ to $SO_3$ is in the range 95-97% in the gaseous mixture exiting converter 26 into conduit 27. The gaseous mixture entering conduit 27 has a temperature typically in the range 850-890° F. (454°-477° C.) and an $SO_3$ concentration in the range 4-7½% at all production rates above the intermediate rate (50-60% of the maximum rate). In one embodiment, conduit 27 may be heated between converter 26 and injector manifold assembly 28, employing heating elements at spaced intervals along conduit 27. The greater the length of conduit 27, the greater need for the provision of heating elements, the objective being to prevent the temperature of the mixture of $SO_3$ and air in conduit 27 from dropping below the dew point of sulfuric acid.

The expedient described in the preceding paragraph is employed in an embodiment in which undried, relatively moist process air is introduced into sulfur burner 10 and included in the gaseous mixtures flowing through the system. Undried process air contains water which will react with the $SO_3$ in conduit 27 to form sulfuric acid which will precipitate in conduit 27, if the temperature of the gaseous mixture in conduit 27 drops below the dew point of sulfuric acid; and that is undesirable. In another embodiment, process air from blower 11 is dried at a dryer 13 (dash-dot lines in FIG. 1) upstream of sulfur burner 10 and heater 15. Dryer 13 may be of conventional construction; alternatively, one may employ a process air drying arrangement such as that described in U.K. Patent GB 2 088 350 B, issued Sep. 25, 1984, and the disclosure thereof is incorporated herein by reference.

The use of dried process air eliminates the problem of sulfuric acid precipitating in conduit 27 (or elsewhere in the system) when the temperature drops below the dew point of sulfuric acid. This, in turn, reduces the heating requirements during operation: the temperature of the second mixture ($SO_3$ and air) leaving converter 26 need not be maintained above the dew point of sulfuric acid, in conduit 27 (e.g., need not be at 500° F. (260° C.)); and during a standby mode, one need only keep hot that part of the system upstream of the outlet from converter 26 (for reasons described elsewhere in this specification). Another advantage is that one may locate that part of the system which is upstream of conduit 27 relatively far away from the injectors at 28, without concern about heat loss due to the length of conduit 27; the temperature of the second mixture in conduit 27, upstream of the injectors at 28, may be allowed to drop below the dew point of sulfuric acid. Moreover, because a mixture of $SO_3$ and dry air is relatively non-corrosive compared to a mixture of $SO_3$ and moist air, conduit 27 need not be constructed of the relatively expensive materials required to resist the relatively more corrosive mixture of $SO_3$ and moist air.

When the system depicted in FIGS. 1-2 is initially started up, only air flows through the system; no sulfur flows. During start-up, heater 15 is initially operating at its maximum heating capacity, to provide an air temperature exiting heater 15 of about 800°-950° F. (427°-510° C.); after the air is at that temperature, sulfur flow begins, and there is combustion of air and sulfur in sulfur burner 10. The initial sulfur flow rate and the initial relative amount of combustion are relatively low, so that operation of air heater 15 is required under those conditions.

The sulfur flow rate is gradually increased from the initial rate, and when the ratio of sulfur to air attains that level which provides the desired maximum $SO_2$ concentration (e.g., 7-10%), the control system thereafter automatically changes the air flow rate with changes in sulfur flow rate to maintain a ratio of sulfur to air which provides the desired $SO_2$ concentration at all $SO_2$ production rates above that at which the desired ratio was first attained (the intermediate production rate).

As the sulfur flow rate increases from its initial rate, there is an increase in the heat generated by combustion in sulfur burner 10. As this occurs, the temperature at which heater 15 operates is gradually decreased until eventually heater 15 is turned off; this occurs at a sulfur flow rate which is substantially less than the sulfur flow rate which corresponds to the intermediate $SO_3$ production rate for the system. When heater 15 is turned off, the $SO_2$ concentration may not yet have increased to the desired maximum concentration (e.g., 7-10%), an occurrence which takes place at the intermediate production rate; however, so long as the temperature generated by the reaction of sulfur with oxygen from the air within sulfur burner 10 is adequate to sustain combustion there, and so long as the temperature of the mixture exiting sulfur burner 10 is high enough to satisfy the temperature requirements at converter 26, heater 15 can be inoperative while the $SO_2$ concentration is still being gradually increased.

The heater remains off at all production rates above the aforementioned lesser production rate. Should the production rate drop below the lesser production rate, the heater will be turned back on. As noted above, the lesser production rate for $SO_3$ (and $SO_2$) is typically substantially less than one-half the maximum production rate (e.g., about 35%); the maximum production rate is determined by the capacity of the boiler whose flue gas is to be conditioned.

After start-up, there can be conditions of operation (e.g., stand by operation) during which there may be no sulfur flow through the system, but in which air flow is still provided in order to prevent the injectors at 28 from clogging with fly ash, for example. Under those conditions, heater 15 would be operating. During stand-by, heater 15 operates to maintain the system at a temperature sufficiently high to, among other things, prevent sulfuric acid from precipitating out within the system, i.e., a temperature above the dew point of sulfuric acid. Typically, heater 15 is controlled to produce a stand-by air temperature in conduit 16 of about 800°-950° F. (427°-510° C.). At that air temperature coming out of the heater, the entire system will be maintained in a ready condition for sulfur burning once sulfur flow is started.

There are other situations in which heater 15 can be operated. For example, when the system is to be shut down, it is purged of residual $SO_2$ and $SO_3$ during a purge mode in which heated air only is blown through the system; the purge air is typically heated to about 800°-900° F. (427°-482° C.) at heater 15. A hold mode is used for a period of several hours preceding start-up; during the hold mode air is blown through the system at the minimum air flow rate which will keep the injectors at 28 from plugging, and heater 15 is set for manual adjustment by the system operator.

In summary, heater 15 is operated during start-up, stand-by, hold and purge modes, and during production rates which are below the lesser production rate. During virtually all other production rates, the heat generated by combustion in sulfur burner 10 will satisfy the temperature requirements for the system; this reduces substantially the amount of energy required to operate heater 15 and correspondingly reduces substantially the operating expense for the entire system.

Generally, cooler 23 is inoperative while heater 15 is operative, and vice versa. However, in situations where there is a rapid change in sulfur flow rates, there may be some overlapping in the operation of heater 15 and cooler 23.

As noted above, the concentration of $SO_3$ in the gaseous mixture introduced into the injectors at 28 is in the range 4-7½% over a wide range of production rates. This is a relatively high $SO_3$ concentration compared to the concentration of $SO_3$ conventionally employed in many flue gas conditioning systems, e.g., 1-2%. When the gas mixture in the converter is cooled between first and second converter stages 51 and 52, and the cooling medium is air, the $SO_3$ concentration will be diluted (i.e., decreased). Therefore, in order to end up with an $SO_3$ concentration in the range 4-7½%, it is necessary to employ a substantially higher $SO_2$ concentration in the gas entering converter 26 through conduit 24, e.g. an $SO_2$ concentration of 7-10%. On the other hand, if the gas undergoing cooling between first and second converter stages 51 and 52 is cooled with a radiant cooling medium, no dilution occurs on account of cooling, so that the concentration of the $SO_3$ in conduit 27 corresponds more closely to the concentration of the $SO_2$ in the gas entering converter 26 through conduit 24.

In accordance with the objective of the present invention, i.e., to maintain relatively low the volume of gas handled by the system, the cooling undergone by the first mixture of air and sulfur dioxide, at cooler 23 between sulfur burner 10 and converter 26, is accomplished without diluting the high $SO_2$ concentration (7-10%) coming out of sulfur burner 10.

At the system's maximum production rate, a $SO_2$ concentration greater than about 7½% can produce a gas temperature out of sulfur burner 10 of about 1400° F. (760° C.)) which is too hot to be handled by at least part of the system such as conduit 22. At lesser production rates, a higher $SO_2$ concentration than 7½% could be employed because, for a given $SO_2$ concentration, the temperature produced by combustion of sulfur at less than the maximum production rate is lower than the temperature produced at the maximum production rate. The higher the $SO_2$ concentration, the lower the gas volume, for a given amount of $SO_2$, which is desirable.

In addition to operating the system at a relatively high concentration of $SO_3$ (and $SO_2$), in a preferred embodiment the entire system is pressurized, typically at about 4-8 psig (27.6-55.12 × $10^3$ pa) at the upstream end of the system at air blower 11. The pressure decreases progressively in a downstream direction through the system. Operating the system under pressurized conditions improves the conversion of $SO_2$ to SO₃ in converter 26, compared to a system operating without pressurization.

Because the method of the present invention employs a relatively high concentration of $SO_2$ and $SO_3$ at all production rates between the maximum and intermediate rates, the relative volume of air and of the total gas which the processing system is required to handle is relatively low, and this reduces the size of the processing vessels and conduits in the system, in turn reducing the capital expense for the system. Because the processing system preferably operates under pressurized conditions, this also reduces the volume of the gas handled by the system, in turn reducing the size of the vessels and conduits in the system, and this also contributes to a reduction in capital expense. The smaller the size of the equipment required to handle the volumes of gas moving through the system, the less heat loss there is in the system, and this, in turn, reduces the heating requirements at heater 15.

As the sulfur flow rate is decreased, in response to a decrease in the requirements for $SO_3$, the air flow rate is correspondingly decreased to maintain a constant ratio of air to sulfur until the air flow rate reaches a minimum level corresponding to that required to prevent the injectors at 28 from becoming plugged with fly ash. Once the air flow rate reaches that minimum level, a further decrease in sulfur flow rate will not be accompanied by a corresponding decrease in air flow rate, so that the ratio of sulfur flow to air flow will drop below that required to maintain the high concentration of $SO_2$ or $SO_3$ previously provided (e.g., 7% and 5% respectively, when the gaseous mixture from first converter stage 51 is cooled with dilution air). For example, the $SO_3$ concentration may drop down to 2½–3% for $SO_3$ production rates in the range 20–30%.

Nevertheless, by operating the system in accordance with the present invention, operating costs are reduced, due to a reduction in the energy required for operating air heater 15, to about 25% of the operating expenses for a system employing a fixed volume of air from the air blower and a maximum $SO_3$ concentration of 1.5%.

Set forth below is a tabulation of some parameters in an embodiment of a method performed in accordance with the present invention. The method is performed in a flue gas conditioning system having a maximum $SO_3$ production rate of 332 lbs./hr. (149 kg/hr.) and a maximum sulfur flow rate of 140 lbs./hr. (63 kg/hr.).

heater is off at production rates between the maximum rate and a lesser rate (about 35% of the maximum rate) which is substantially below the intermediate rate. The $SO_2$ cooler is in operation at production rates beginning slightly above the intermediate production rate and up to the maximum rate. The intermediate production rate reflects the operational parameter at which (1) a decrease in sulfur flow rate (due to a decrease in demand for $SO_3$ for flue gas treatment) is no longer accompanied by a decrease in (2) air flow rate, resulting in a reduction in $SO_2$ concentration with further decreases in sulfur flow rate. As previously noted, the minimum air flow rate is that which is required to prevent fly ash from plugging the $SO_3$ injectors.

The foregoing detailed description has been given for clearness of understanding only, and no unnecessary limitations should be understood therefrom, as modifications will be obvious to those skilled in the art.

We claim:

1. In a method for producing, in a flue gas conditioning system, dilute sulfur trioxide ($SO_3$) for treating flue gas, wherein said method comprises introducing air and sulfur into a sulfur burner, reacting said air and said sulfur in said sulfur burner to produce a first mixture comprising sulfur dioxide ($SO_2$) and air, introducing said first mixture into a converter, converting the $SO_2$ in said first mixture to $SO_3$ to produce a second mixture comprising $SO_3$ and air, and heating the air introduced into the sulfur burner at least some of the time, the improvement comprising the steps of:

measuring at least one parameter reflecting the fly ash content of the flue gas;

varying the $SO_2$ production rate, in response to a variation in a parameter reflecting the fly ash content of the flue gas, by varying the flow rate of sulfur introduced into the sulfur burner;

controlling the ratio of sulfur to air introduced into said sulfur burner to produce a first mixture, having a relatively high $SO_2$ concentration at the maximum $SO_2$ production rate for said system, and which, at said maximum $SO_2$ production rate, requires cooling to a conversion temperature prior to converting the $SO_2$ to $SO_3$;

varying the flow rate of air introduced into said sulfur burner, in response to a variation in said sulfur flow rate, to maintain said ratio of sulfur to air and said high $SO_2$ concentration, at all $SO_2$ production rates

| % of Max. Production Rate | Air Heater Power, kW | Air Heater Outlet Temp., °F. | Sulfur Burner Outlet Temp., °F. | SO₂ Cooler Outlet Temp., °F. | Sulfur Burner Air Flow Rate, SCFM | SO₂ Conc., % | SO₃ Conc., % | Press. at Air Blower, Psig |
|---|---|---|---|---|---|---|---|---|
| 0% | 58.6 | 930.0 | 845.5 | 833.8 | 214.5 | 0.0 | 0.0 | 1.3 |
| 10% | 42.9 | 708.7 | 836.4 | 825.1 | 214.5 | 1.3 | 1.2 | 1.4 |
| 20% | 27.1 | 487.3 | 832.0 | 821.0 | 214.5 | 2.6 | 2.3 | 1.4 |
| 30% | 11.4 | 266.0 | 843.8 | 832.7 | 214.5 | 3.9 | 3.2 | 1.5 |
| 37% | 0.0 | 105.0 | 854.8 | 843.6 | 214.5 | 4.9 | 3.8 | 1.6 |
| 40% | 0.0 | 105.0 | 906.1 | 850.0 | 214.5 | 5.3 | 4.0 | 1.6 |
| 50% | 0.0 | 105.0 | 1089.9 | 850.0 | 214.5 | 6.6 | 4.8 | 1.7 |
| 60% | 0.0 | 105.0 | 1153.2 | 850.0 | 242.8 | 7.0 | 5.0 | 2.0 |
| 70% | 0.0 | 105.0 | 1162.8 | 850.0 | 283.2 | 7.0 | 5.0 | 2.4 |
| 80% | 0.0 | 105.0 | 1170.0 | 850.0 | 323.7 | 7.0 | 5.0 | 2.8 |
| 90% | 0.0 | 105.0 | 1175.6 | 850.0 | 364.2 | 7.0 | 5.0 | 3.3 |
| 100% | 0.0 | 105.0 | 1179.9 | 850.0 | 403.1 | 7.0 | 5.0 | 3.8 |

The foregoing tabulation reflects a method wherein the $SO_2$ (and $SO_2$) concentrations are maintained at a maximum for all production rates between the maximum production rate and an intermediate production rate which is between 50 and 60% of the maximum rate, i.e., substantially below the maximum rate. The air between said maximum rate and an intermediate production rate substantially less than said maximum rate;

introducing said first mixture from said sulfur burner into said converter without diluting said first mixture with air;

maintaining the $SO_2$ concentration within a concentration range sufficiently high so that the heat generated by the reaction in said sulfur burner is sufficient to sustain that reaction and to provide the first mixture entering the converter with a temperature sufficient to support the conversion reaction, at all $SO_2$ production rates between said maximum rate and a lesser production rate substantially below said intermediate rate;

and avoiding heating, with externally generated heat, said air introduced into said sulfur burner, during all $SO_2$ production rates between said maximum rate and said lesser rate.

2. A method as recited in claim 1 wherein:
said $SO_2$ concentration is about 7–10% at $SO_2$ production rates between said maximum production rate and said intermediate rate and said $SO_2$ concentration is substantially lower at said lesser production rate.

3. A method as recited in claim 2 wherein:
said lesser $SO_2$ production rate is substantially less than one-half said maximum production rate.

4. A method as recited in claim 3 wherein:
said lesser $SO_2$ production rate is about 35% of said maximum production rate.

5. A method as recited in any of claims 2–4 wherein:
said intermediate production rate is in the range of about 50–60% of said maximum production rate.

6. A method as recited in any of claims 2–4 wherein:
said substantially lower $SO_2$ concentration is in the range 4–5% at said lesser production rate.

7. A method as recited in claim 1 and comprising:
cooling said first mixture without diluting said $SO_2$ concentration;
and performing said cooling step at said maximum $SO_2$ production rate and at production rates below said intermediate rate.

8. A method as recited in claim 1 and comprising:
pressurizing said system sufficiently to allow a substantial reduction in the volume of said system compared to an unpressurized system producing the same amount of $SO_3$.

9. A method as recited in claim 8 wherein said system is pressurized up to about 4–8 psig ($27.56–55.12 \times 10^3$ Pa) at the upstream end of said system.

10. A method as recited in claim 1 wherein said system comprises injectors for injecting said second mixture into said flue gas and wherein:
said ratio-controlling step comprises reducing the amount of sulfur introduced into said sulfur burner as the $SO_2$ production requirements decrease from said maximum production rate;
said step of varying the air flow rate comprises decreasing the flow rate of air introduced into said sulfur burner in direct proportion to a decrease in the flow rate of sulfur introduced therein, to maintain said ratio and said high $SO_2$ concentration;

and, as the $SO_2$ production requirements continue to decrease, ceasing said air decreasing step, without ceasing said sulfur reducing step, when the amount of air has decreased to about the minimum amount of air required to prevent plugging of said injectors;

the $SO_2$ production rate at which said ceasing occurs corresponding to said intermediate rate.

11. A method as recited in claim 1 wherein:
said converting step is performed in two stages to produce a partially converted gaseous mixture of $SO_3$, $SO_2$ and air between the two conversion stages;
and there is cooling of said partially converted mixture between said conversion stages.

12. A method as recited in claim 11 wherein:
said partially converted gaseous mixture is cooled with air between said conversion stages;
said second mixture of $SO_3$ and air has an $SO_3$ concentration in the range of about $4–7\frac{1}{2}\%$ after the second conversion stage;
and said high $SO_2$ concentration is in the range of about 7–10%.

13. A method as recited in claim 11 wherein:
said partially converted gaseous mixture is subjected to cooling without dilution between said conversion stages;
and said high $SO_2$ concentration is in the range of about 7–10%.

14. A method as recited in claim 13 wherein said cooling is radiant cooling.

15. A method as recited in claim 13 wherein said cooling is indirect cooling in a concentric tube cooler.

16. A method as recited in claim 1 and comprising:
injecting said second mixture into flue gas;
drying said air upstream of said sulfur burner to reduce the moisture content of said air so as to avoid the formation of sulfuric acid prior to said injecting step;
and allowing said second mixture to cool, prior to said injecting step, to a temperature which is below the dew point of sulfuric acid, without precipitating sulfuric acid from said second mixture prior to said injecting step.

17. A method as recited in claim 16 wherein:
said second mixture has a temperature, at the conclusion of said converting step, which is substantially above the dew point of sulfuric acid;
and the distance between (a) the location at which said converting step is performed and (b) the location at which said injecting step is performed is sufficiently lengthy that the temperature of said second mixture falls below the dew point of sulfuric acid at a location upstream of said location at which the injecting step is performed.

* * * * *

UNITED STATES PATENT AND TRADEMARK OFFICE
CERTIFICATE OF CORRECTION

PATENT NO. : 5,244,642
DATED : September 14, 1993
INVENTOR(S) : William G. Hankins, et al.

It is certified that error appears in the above-indentified patent and that said Letters Patent is hereby corrected as shown below:

Col. 2, line 9,           "556°" should be --454°--.

Col. 4, line 50,          "purpose" should be --purposes--.

Col. 10, line 64,         "pa" should be --Pa--.

Signed and Sealed this

Twenty-second Day of March, 1994

Attest:

BRUCE LEHMAN

*Attesting Officer*     *Commissioner of Patents and Trademarks*